(12) United States Patent
Xu

(10) Patent No.: US 8,127,108 B2
(45) Date of Patent: Feb. 28, 2012

(54) APPARATUS, SYSTEM AND METHOD FOR PREFETCHING DATA IN BUS SYSTEM

(75) Inventor: Haihui Xu, Taipei (TW)

(73) Assignee: Via Technologies, Inc., Hsin-Tien, Taipei (TW)

(*) Notice: Subject to any disclaimer, the term of this patent is extended or adjusted under 35 U.S.C. 154(b) by 395 days.

(21) Appl. No.: 12/430,939

(22) Filed: Apr. 28, 2009

(65) Prior Publication Data

US 2010/0180099 A1 Jul. 15, 2010

(30) Foreign Application Priority Data

Jan. 9, 2009 (CN) .......................... 2009 1 0001521

(51) Int. Cl.
*G06F 9/26* (2006.01)

(52) U.S. Cl. .................... 711/213; 711/137; 710/110

(58) Field of Classification Search ............. 711/213, 711/137, 133, 144, 170, 113, 146; 710/110, 710/119, 62, 244, 111, 113

See application file for complete search history.

(56) References Cited

U.S. PATENT DOCUMENTS

| | | | |
|---|---|---|---|
| 5,423,029 A * | 6/1995 | Schieve ........................ 714/42 |
| 6,453,388 B1 | 9/2002 | Gonzales et al. | |
| 6,601,130 B1 * | 7/2003 | Silvkoff et al. .................... 711/5 |
| 2005/0114742 A1 * | 5/2005 | Takenobu ........................ 714/56 |
| 2007/0156937 A1 * | 7/2007 | Seong et al. .................. 710/110 |

FOREIGN PATENT DOCUMENTS

CN 101048762 10/2007

OTHER PUBLICATIONS

English abstract of CN101048762, pub. Oct. 3, 2007.

* cited by examiner

*Primary Examiner* — Dang Nguyen
(74) *Attorney, Agent, or Firm* — Thomas|Kayden

(57) ABSTRACT

A method for prefetching data in a bus system is provided. First, according to an address signal from a master, a prefetching address generator generates a prefetching address signal and transfers it to a first select circuit. In response to a signal from the master indicates that the address is related to the previous address and the control signal is identical to the previous transfer, or in response to a signal from the master indicates that the address and control signals are unrelated to the previous transfer but is matched to a hit logic, a prefetching controller directs the first select circuit to transfer the prefetching address signal to a slave. And the prefetching controller also directs a second select circuit to transfer the prefetched data which is corresponding to the prefetching address signal from the slave to a master.

20 Claims, 6 Drawing Sheets

APPARATUS, SYSTEM AND METHOD FOR PREFETCHING DATA IN BUS SYSTEM

CROSS REFERENCE TO RELATED APPLICATIONS

This Application claims priority of China Patent Application No. 200910001521.8, filed on Jan. 9, 2009, the entirety of which is incorporated by reference herein.

BACKGROUND OF THE INVENTION

1. Field of the Invention

The invention relates to prefetching data, and more particularly to an apparatus and method for prefetching data in a bus system.

2. Description of the Related Art

The Advanced High-Performance Bus (AHB) protocol, is a bus protocol introduced within the Advanced Microcontroller Bus Architecture (AMBA), which has the following features of: burst transfers, split transactions, non-tristate implementation, several bus Masters, large bus-widths (64/128 bit) and single-cycle bus master handover. According to the features, AHB can be implemented in a high-performance and high-clock-frequency system. AHB comprises three parts: a Master, a Slave and a Infrastructure part, wherein data transfer within the AHB is issued by the Master and responded by the Slave.

FIG. 1 shows a timing diagram of the signals within a conventional AHB system. As shown in FIG. 1, the signal M_HTRANS is a control signal provided by the Master to indicate to the transmission type of a data transfer, which comprises: Idle, Busy, Sequential and Non-sequential data transfer transmission types. The signal M_HADDR is an address signal provided by the Master, and the signal M_HRDATA is the data received by the Master. The signal S_HADDR is an address signal received by the Slave, and the signal S_HRDATA is the read data response from the Slave. In time period T1, the Master issues the signal M_HTRANS to indicate that the transmission type is Non-sequential, i.e. the current transferring address and control signals are unrelated to the last transferring address and control signals. In addition, the Master issues the address signal M_HADDR and the control signal M_HWRITE to read the data of address A0. Next, in time period T2, the Master issues the signals to read the data of address A1. The Slave receives the address signal A0 in time period T2, and responds by sending the data D0 of the address A0 to the Master in time period T4, and then the Master receives the data D0 in time period T5. Next, the slave receives the address signal A1 in time period T6 and responds by sending the data D1 to the Master in time period T7, and then the Master receives the data D1 in time period T8. In a conventional AHB system, the Master issues the signals in time period T1 to request to read the data of the address A0 and receives the responded data D0 in time period T5, wherein the time interval between time periods T1 and T4 is 4 time periods. Furthermore, the Master issues the signals in time period T2 to request to read the data of the address A1 and receives the responded data D1 in time period T8, which further requires 6 time periods. Therefore, improvement in data transfer speed of an AHB bus system is desired.

BRIEF SUMMARY OF THE INVENTION

An apparatus, system and method for prefetching data in a bus system are provided, thereby increasing reading speed and the bus efficiency thereof.

An exemplary embodiment of such an apparatus for prefetching data comprises a prefetching address generator, a prefetching controller, a first select circuit, a second select circuit, a first register group and a second register group. The first select circuit is coupled to a Master, the prefetching address generator and the first register group. The first select circuit receives the signals from the Master and the prefetching address generator. The prefetching controller directs the first select circuit to select one signal from the received signals to output to the first register group. The second select circuit is coupled to a Slave, the second register group and the Master. The second select circuit receives the signals from the slave and the second register group. The prefetching controller directs the second select circuit select one signal from the received signals to output to the Master. The prefetching address generator generates a prefetching address signal according to the address signal from the Master and transfers the prefetching address signal to the first select circuit, wherein the prefetching address signal comprises a plurality of prefetching address signals. In one embodiment, the prefetching controller further comprises an address storage for storing a specific address, which may be an address range, a single address or various addresses. In response to the address signal from the Master is corresponded to the specific address, the prefetching controller directs the prefetching address generator to stop generating the prefetching address signal.

In response to a signal from the Master indicates that the address signal is related to a last address signal and a control signal is identical to a last control signal, or in response to a signal from the Master indicates that the address signal and the control signal are unrelated to the last address and control signals but is matched to a hit logic, the prefetching controller directs the first select circuit to transfer the prefetching address signal generated by the prefetching address generator to the first register group, and then the prefetching address signal is transferred to the Slave. In addition, the prefetching controller directs the second select circuit to transfer a prefetched data responded by Slave from the second register group to the Master. The hit logic is matched when the signals S_HADDR, S_HWRITE and S_HSIZE received by the Slave are identical to the signals M_HADDR, M_HWRITE and M_HSIZE transferred by the Master, wherein the signal M_HADDR is an address signal provided by the Master, the signal M_HWRITE is a control signal provided by the Master for indicating a read or write operation, and the signal M_HSIZE is a control signal provided by the Master for indicating the size of the transmission data. The prefetching controller may direct the Master to receive the prefetched data by issuing a signal to the Master in response to the prefetched data to be transferred to the Master is corresponded to the address signal provided by the Master. On the contrary, the prefetching controller may direct the Master to ignore the prefetched data by issuing a signal to the Master in response to the prefetched data to be transferred to the Master is not corresponded to the address signal provided by the Master. In the embodiment, the prefetching apparatus is an advanced high-performance bus bridge.

Furthermore, an exemplary embodiment of a system for prefetching data in a bus system is provided. The system is coupled to n Masters and n first devices, wherein all Masters are full connected to all first devices. The system comprises n first routers, n arbitrators and n prefetching apparatuses. Each of the n first routers is coupled to one of the n Masters and all of the n arbitrators. Each of the n prefetching apparatuses is coupled to one of the n arbitrators and one of the n first devices. The n arbitrators are used to arbitrate the transferring sequences of received signals. The n first routers are used to transfer signals from the n Masters to the n corresponding arbitrators or to transfer signals from the n arbitrators to the n corresponding Masters. Each of the n prefetching apparatuses comprises a prefetching address generator, a prefetching controller, a first select circuit, a second select circuit, a first register group and a second register group. The first select circuit is coupled to the corresponding arbitrator, the prefetching address generator and the first register group. The first select circuit receives the signals from the corresponding Master via the corresponding arbitrator and the corresponding first router and receives prefeching address signals from the prefetching address generator. The prefetching controller directs the first select circuit to select one signal from the received signals to output to the first register group. The second select circuit is coupled to the corresponding first device, the second register group and the corresponding arbitrator. The second select circuit receives the signals from the corresponding first device and the second register group. The prefetching controller directs the second select circuit to select one signal from the received signals to output to the corresponding arbitrator. The prefetching address generator generates a prefetching address signal according to the address signal from the corresponding Masters via the corresponding arbitrators and the corresponding first routers and transfers the prefetching address signal to the first select circuit, wherein the prefetching address signal comprises a plurality of prefetching address signals. In one embodiment, the prefetching controller further comprises an address storage for storing a specific address, which may be an address range, a single address or various addresses. In response to the address signal from the corresponding Master is corresponded to the specific address, the prefetching controller directs the prefetching address generator to stop generating the prefetching address signal.

In response to a signal from the corresponding Master indicates that the address signal is related to a last address signal and a control signal is identical to a last control signal, or in response to a signal from the corresponding Master indicates that the address signal and the control signal are unrelated to the last address and control signals but is matched to a hit logic, the prefetching controller directs the first select circuit to transfer the prefetching address signal generated by the prefetching address generator to the first register group, and then the prefetching address signal is transferred to the corresponding first device. In addition, the prefetching controller directs the second select circuit to transfer a prefetched data responded by the corresponding first device from the second register group to the corresponding Master via the corresponding arbitrator and the corresponding first router. The hit logic is matched when the signals S_HADDR, S_HWRITE and S_HSIZE received by the n corresponding first devices are identical to the signals M_HADDR, M_HWRITE and M_HSIZE transferred by the n corresponding Masters, wherein the signal M_HADDR is an address signal provided by the Master, the signal M_HWRITE is a control signal provided by the Master for indicating a read or write operation, and the signal M_HSIZE is a control signal provided by the Master for indicating the size of the transmission data. The prefetching controller may direct the corresponding Master to receive the prefetched data by issuing a signal to the Master in response to the prefetched data to be transferred to the corresponding Master is corresponded to the address signal provided by the corresponding Master. On the contrary, the prefetching controller may direct the corresponding Master to ignore the prefetched data by issuing a signal to the corresponding Master in response to the prefetched data to be transferred to the corresponding Master is not corresponded to the address signal provided by the corresponding Master.

In the system, the n first devices may be n Slaves or n second routers. If the first devices are the second routers, each second routers is coupled to m Slaves. The n second routers transfer the signal from the n prefetching apparatuses to the corresponding n×m Slaves or from the n×m Slaves to the n corresponding prefetching apparatuses. Thus, the system may support n×m Slaves.

Furthermore, an exemplary embodiment of a method for prefetching data in a bus system is provided. First, a prefetching address generator generates a prefetching address signal according to an address signal from a Master, and transfers the prefetching address signal to a first select circuit. Next, the prefetching controller may determine whether the current transferring address signal is related to the last transferring address signal and the current transferring control signal is identical to the last transferring control signal. In response to a control signal M_HTRANS from the Master indicates that a transmission type is Sequential, i.e. a current transferring address signal is related to a last transferring address signal and a current transferring control signal is identical to a last transferring control signal, the prefetching controller may direct the first select circuit to provide the prefetching address signal generated by the prefetching address generator to a Slave. Next, the prefetching controller directs the second select circuit to transfer a prefetched data provided by the Slave to the Master. At this time, the prefetching controller may determine whether the prefetched data is corresponded to the address signal from the Master. In response to the prefetched data to be transferred to the Master is corresponded to the address signal provided by the Master, the prefetching controller may issue a signal to the Master, to indicate to the Master to receive the prefetched data. On the contrary, the prefetching controller may issue a signal to the Master in response to the prefetched data to be transferred to the Master is not corresponded to the address signal provided by the Master, to indicate to the Master to ignore the prefetched data.

In response to the signal from the Master indicates that the transmission type is Non-sequential, i.e. the current transferring address and control signals are unrelated to the last transferring address and control signals, the prefetching controller may determine whether the signal transmission of the system is matched to a hit logic. The hit logic is matched when the signals S_HADDR, S_HWRITE and S_HSIZE received by the Slave are identical to the signals M_HADDR, M_HWRITE and M_HSIZE transferred by the Master, wherein the signal M_HADDR is an address signal provided by the Master, the signal M_HWRITE is a control signal provided by the Master for indicating a read or write operation, and the signal M_HSIZE is a control signal provided by the Master for indicating the size of the transmission data. When it is determined that the hit logic has been matched, the prefetching controller may direct the first select circuit to provide the prefetching address signal generated by the prefetching address generator to the Slave. Next, the prefetching controller may direct the second select circuit to transfer the prefetched data provided by the Slave to the Master. At this time, the prefetching controller may determine whether the prefetched data is corresponded to the address signal from the Master. In response to the prefetched data to be transferred to the Master is corresponded to the address signal provided by the Master, the prefetching controller may issue a signal to the Master, to indicate to the Master to receive the prefetched data. On the contrary, the prefetching controller may issue a signal to the Master in response to the prefetched data to be transferred to the Master is not corresponded to the address signal provided by the Master, to indicate to the Master to ignore the prefetched data. Furthermore, in response to the hit logic is not matched, the prefetching controller may direct the first select circuit to transfer the address signal provided by the Master to the Slave. Next, the prefetching controller may direct the second select circuit to transfer the read data from the Slave to the Master.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
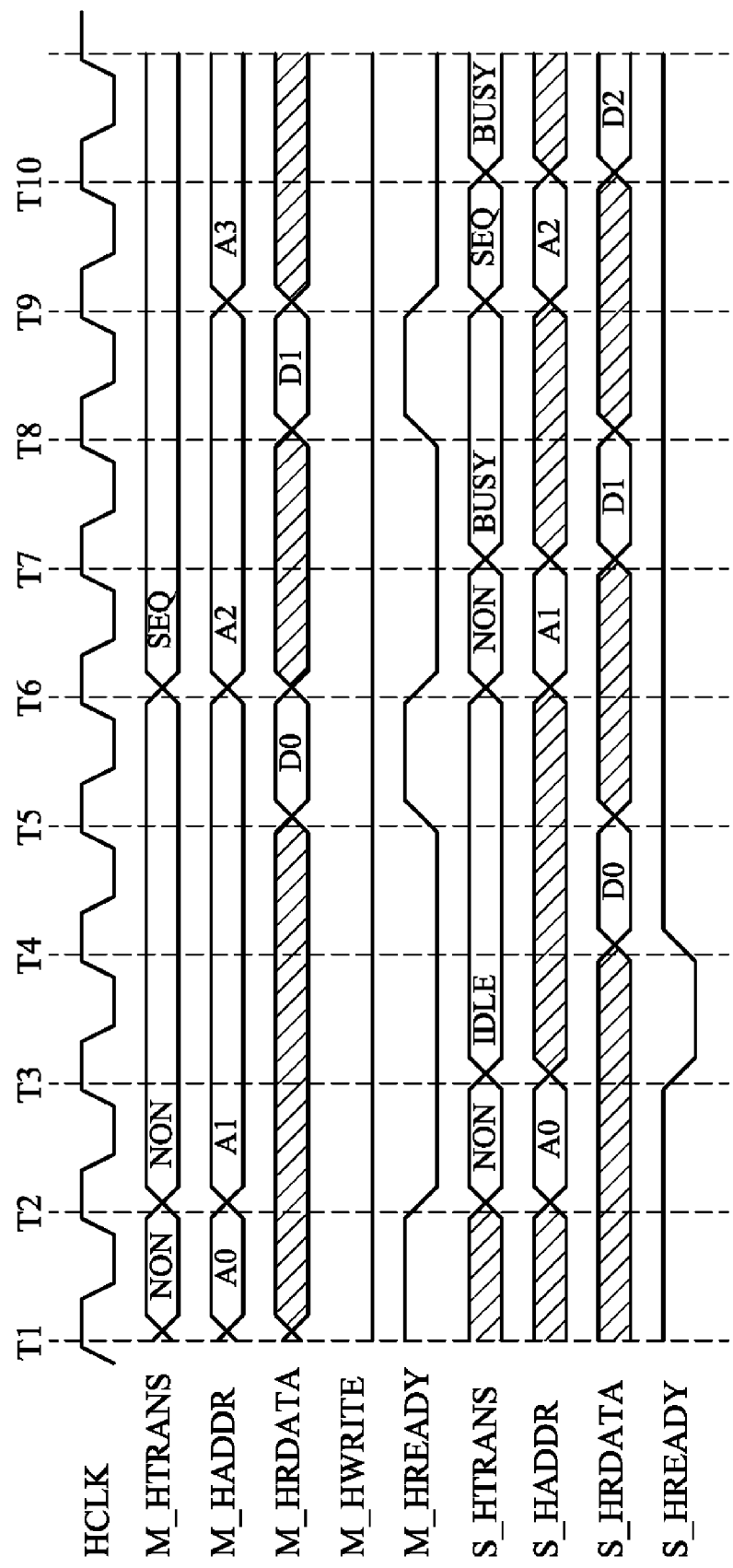
FIG. 1 shows a timing diagram of the signals within a conventional AHB system.
Figure 2:
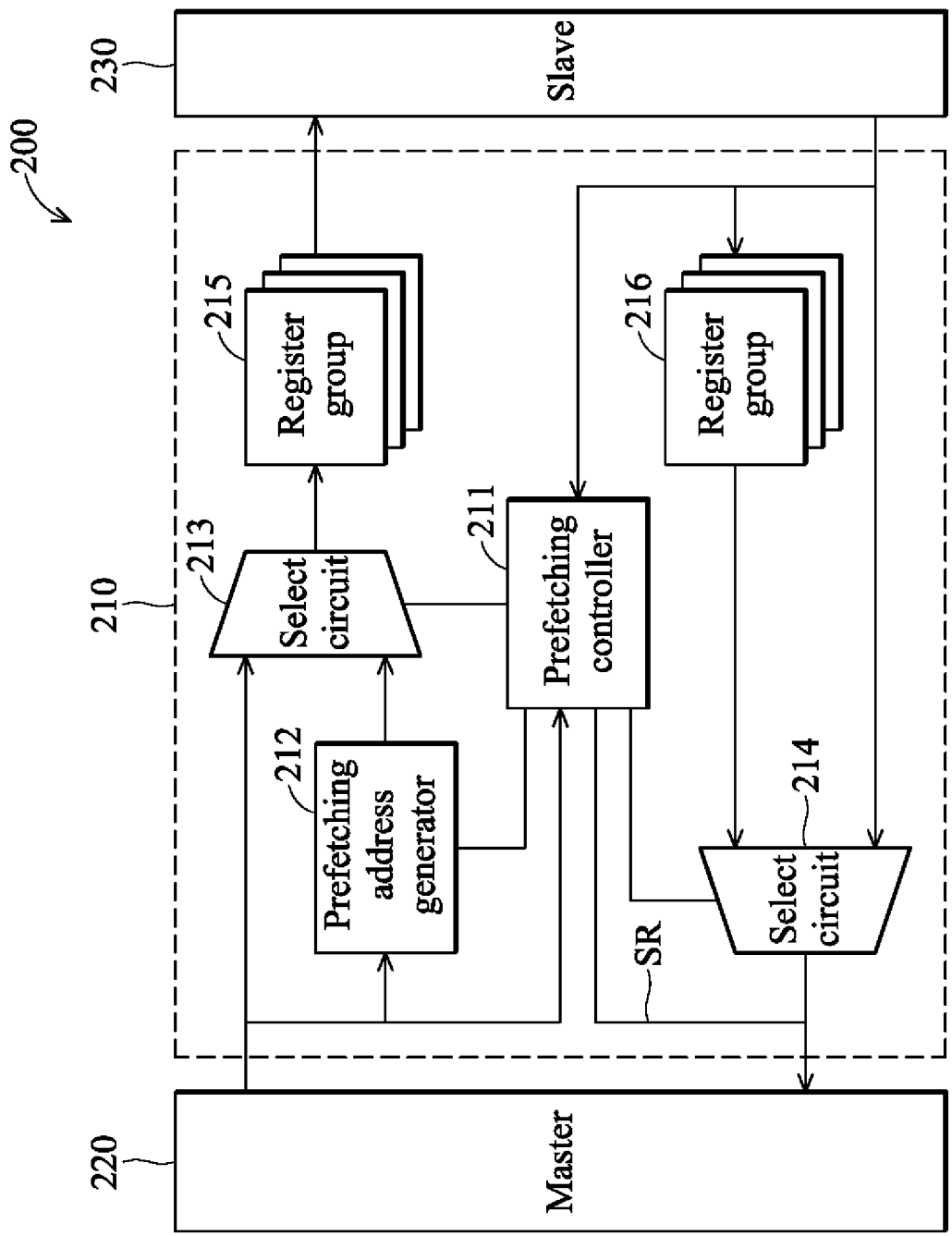
FIG. 2 shows a block diagram of a bus system according to an embodiment of the invention.

FIG. 2 shows a block diagram of a bus system 200 according to an embodiment of the invention. As shown in FIG. 2, the bus system 200 comprises a prefetching apparatus 210, a Master 220 and a Slave 230, wherein the prefetching apparatus 210 comprises a prefetching controller 211, a prefetching address generator 212, the select circuits 213~214 and the register groups 215~216. In the bus system 200, the select circuit 213 is coupled to the Master 220, the prefetching address generator 212 and the register group 215. The select circuit 213 is used to receive the signals from the Master 220 and the prefetching address generator 212. Next, the prefetching controller 211 may direct the select circuit 213 to select one signal from the received signals and provide the selected signal to the register group 215. The select circuit 214 is coupled to the Slave 230, the register group 216 and the Master 220. The select circuit 214 is used to receive the signals from the Slave 230 and the register group 216. Next, the prefetching controller 211 may direct the select circuit 214 to select one signal from the received signals and provide the selected signal to the Master 220. In the embodiment, the bus system 200 may be an advanced high-performance bus system.

First, the Master 220 may provide the signals to the select circuit 213 and the prefetching address generator 212, wherein the signals comprise the control signals and the address signals. In the embodiment, a control signal M_HWRITE indicates to read data. Next, the prefetching address generator 212 may predict a next possible read address to generate a prefetching address signal according to an address signal M_HADDR and a control signal M_HBURST from the Master 220, and then the prefetching address signal is transferred to the select circuit 213. In the embodiment, the prefetching address signal may be the signal comprising a plurality of prefetching address signals. In response to a control signal M_HTRANS from the Master 220 indicates that a transmission type is sequential, i.e. a current transferring address signal is related to a last transferring address signal and a current transferring control signal is identical to a last transferring control signal, the prefetching controller 211 may direct the select circuit 213 to provide the prefetching address signal generated by the prefetching address generator 212 to the register group 215 to store the prefetching address signal. Next, the prefetching address signal is transferred to the Slave 230. Next, the Slave 230 may read the data as a prefetched data according to the prefetching address signal and transfer the prefetched data to the register group 216 to store the prefetched data, and then the prefetched data is transferred to the select circuit 214. Next, the prefetching controller 211 may direct the select circuit 214 to transfer the prefetched data from the register group 216 to the Master 220. In the embodiment, the register group 215 is used to store instructions and data, and the register group 216 is used to store data. The select circuits 213 and 214 may be multiplexers. The prefetching controller 211 may issue a signal SR to the Master 220 in response to the prefetched data to be transferred to the Master 220 is corresponded to the address signal provided by the Master 220, to indicate to the Master 220 to receive the prefetched data. On the contrary, the prefetching controller 211 may issue a signal SR to the Master 220 in response to the prefetched data to be transferred to the Master 220 is not corresponded to the address signal provided by the Master 220, to indicate to the Master 220 to ignore the prefetched data.

In response to the control signal M_HTRANS from the Master 220 indicates that the transmission type is Non-sequential, i.e. the current transferring address and control signals are unrelated to the last transferring address and control signals but is matched to a hit logic, the prefetching controller 211 may also direct the select circuit 213 to provide the prefetching address signal generated by the prefetching address generator 212 to the register group 215 to store the prefetching address signal. Next, the prefetching address signal is transferred to the Slave 230. Next, the Slave 230 may read the data as a prefetched data according to the prefetching address signal and transfer the prefetched data to the register group 216 to store the prefetched data, and then the prefetched data is transferred to the select circuit 214. Next, the prefetching controller 211 may also direct the select circuit 214 to transfer the prefetched data from the register group 216 to the Master 220. Similarly, the prefetching controller 211 may issue a signal SR to the Master 220 in response to the prefetched data to be transferred to the Master 220 is corresponded to the address signal provided by the Master 220, to indicate to the Master 220 to receive the prefetched data. On the contrary, the prefetching controller 211 may issue a signal SR to the Master 220 in response to the prefetched data to be transferred to the Master 220 is not corresponded to the address signal provided by the Master 220, to indicate to the Master 220 to ignore the prefetched data. In the embodiment, the hit logic is matched when the signals S_HADDR, S_HWRITE and S_HSIZE received by the Slave 230 are identical to the signals M_HADDR, M_HWRITE and M_HSIZE transferred by the Master 220, wherein the signal M_HADDR is an address signal provided by the Master 220, the signal M_HWRITE is a control signal provided by the Master 220 for indicating a read or write operation, and the signal M_HSIZE is a control signal provided by the Master 220 for indicating the size of the transmission data.

In response to the control signal M_HTRANS from the Master 220 indicates that the transmission type is Busy, Idle or Non-sequential but is not matched with the hit logic, the prefetching controller 211 may direct the select circuit 213 to provide the address signal from the Master 220 to the register group 215 to store the address signal. Next, the address signal is transferred to the Slave 230. Next, the Slave 230 may read the data corresponding to the address signal and transfer the read data to the select circuit 214. Next, the prefetching controller 211 may direct the select circuit 214 to transfer the read data provided by the Slave 230 to the Master 220.

In the embodiment, the prefetching controller 211 may comprise an address storage for storing a specific address, wherein the specific address may be an address range, a single address or various addresses. In response to the address signal from the Master is corresponded to the specific address, the prefetching controller 211 directs the prefetching address generator 212 to not generate the prefetching address signal, or directs the select circuit 213 to select the address signal from the Master 220.

Figure 3:
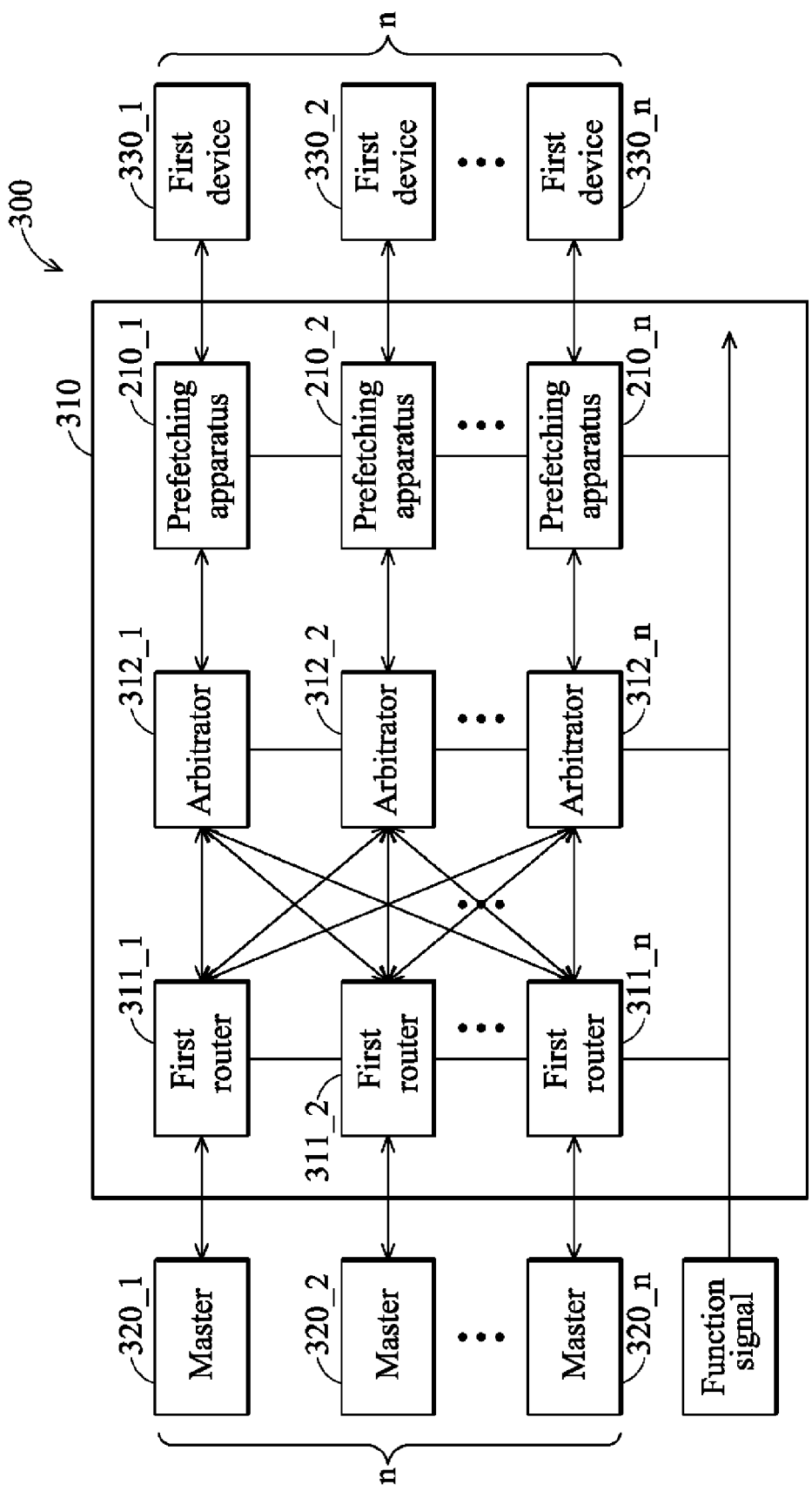
FIG. 3 shows a block diagram of a prefetching system according to an embodiment of the invention.

FIG. 3 shows a block diagram of a prefetching system 300 according to an embodiment of the invention. In the embodiment, n Masters and n Slaves are implemented in the prefetching system 300. As shown in FIG. 3, the prefetching system 300 comprises a complete connecting system 310, the Masters 320_1~320_n and the first devices 330_1~330_n, wherein the complete connecting system 310 further comprises first routers 311_1~311_n, arbitrators 312_1~312_n and prefetching apparatuses 210_1~210_n. In the embodiment, the prefetching system 300 may be an advanced high-performance bus system, and the first devices 330_1~330_n are Slaves. In the prefetching system 300, the Masters 320_1~320_n are coupled to the first routers 311_1~311_n, respectively. Each of the first routers 311_1~311_n is coupled to the arbitrators 312_1~312_n, and each of the prefetching apparatuses 210_1~210_n is coupled to a corresponding arbitrator and a corresponding first device. The arbitrators 312_1~312_n are used to arbitrate the transferring sequences of received signals. The first routers 311_1~311_n are used to transfer signals from the Masters 320_1~320_n to the corresponding arbitrators 312_1~312_n or to transfer signals from the arbitrators 312_1~312_n to the corresponding Masters 320_1~320_n. Each of the prefetching apparatuses 210_1~210_n may be the prefetching apparatus 210, as shown in FIG. 2. Furthermore, each of the prefetching apparatuses 210_1~210_n may further comprise a prefetching controller 211, a prefetching address generator 212, select circuits 213~214 and register groups 215~216. The select circuit 213 is coupled to the corresponding arbitrators 312_1~312_n, the prefetching address generator 212 and the register group 215. The select circuit 213 is used to receive the signals from the corresponding Master 320_1~320_n via the corresponding first routers 311_1~311_n and the corresponding arbitrators 312_1~312_n and the signal from the prefetching address generator 212. Next, the prefetching controller 211 may direct the select circuit 213 to select one signal from the received signals and provide the selected signal to the register group 215. The select circuit 214 is coupled to the corresponding first devices 330_1~330_n, the register group 216 and the corresponding arbitrators 312_1~312_n. The select circuit 214 is used to receive the signals from the corresponding first devices 330_1~330_n and the register group 216. Next, the prefetching controller 211 may direct the select circuit 214 select one signal from the received signals and provide the selected signal to the corresponding arbitrators 312_1~312_n. Next, the selected signal is transferred to the corresponding Master 320_1~320_n via the corresponding first routers 311_1~311_n and the corresponding arbitrators 312_1~312_n.

In one embodiment, the Masters 320_1~320_n may provide the signals to the first routers 311_1~311_n first, wherein the signals comprise the control signals and the address signals. In the embodiment, a control signal M_HWRITE indicates to read data. Next, the first routers 311_1·311_n may transfer the signals from the Master 320_1~320_n to the corresponding arbitrators 312_1~312_n according to the address signal M_HADDR, and then the arbitrators 312_1~312_n may transfer the signals to the corresponding prefetching apparatuses 210_1~210_n, to read the data of the first devices 330_1~330_n via the prefetching apparatuses 210_1~210_n. For example, the Master 320_1 may transfer a signal to the first router 311_1, wherein an address signal of the transferred signal is corresponded to the first device 330_2. Next, the first router 311_1 may transfer the signal to the arbitrator 312_2. Next, the arbitrator 312_2 may transfer the signal to the corresponding prefetching apparatus 210_2, to read the data of the first device 330_2. In the embodiment, the select circuit 213 and the prefetching address generator 212 of each of the prefetching apparatuses 210_1~210_n may receive a signal from the corresponding Masters 320_1~320_n via the corresponding first routers 311_1~311_n and the corresponding arbitrators 312_1~312_n. Next, the prefetching address generator 212 may predict a next possible read address to generate a prefetching address signal according to an address signal M_HADDR and a control signal M_HBURST from the corresponding Masters 320_1~320_n, and may transfer the prefetching address signal to the select circuit 213. In the embodiment, the prefetching address signal may be the signal comprising a plurality of prefetching address signals.

In response to the control signal M_HTRANS from the corresponding Masters 320_1~320_n indicates that the transmission type is Sequential, i.e. a current transferring address signal is related to a last transferring address signal and a current transferring control signal is identical to a last transferring control signal, the prefetching controller 211 may direct the select circuit 213 to provide the prefetching address signal generated by the prefetching address generator 212 to the register group 215 to store the prefetching address signal. Next, the prefetching address signal is transferred to the corresponding first devices 330_1~330_n. Next, the corresponding first devices 330_1~330_n may read the data as a prefetched data according to the prefetching address signal and transfer the prefetched data to the register group 216 to store the prefetched data, and then the prefetched data is transferred to the select circuit 214. Next, the prefetching controller 211 may direct the select circuit 214 to transfer the prefetched data from the register group 216 to the corresponding Masters 320_1~320_n via the corresponding first routers 311_1~311_n and the corresponding arbitrators 312_1~312_n. In the embodiment, the register group 215 is used to store instructions and data, and the register group 216 is used to store data. The select circuits 213 and 214 may be multiplexers. The prefetching controller 211 may issue a signal SR to the corresponding Masters 320_1~320_n via the corresponding first routers 311_1~311_n and the corresponding arbitrators 312_1~312_n in response to the prefetched data to be transferred to the corresponding Masters 320_1~320_n correspond to the address signal provided by the corresponding Masters 320_1~320_n, to indicate to the corresponding Masters 320_1~320_n to receive the prefetched data. On the contrary, the prefetching controller 211 may issue a signal SR to the corresponding Masters 320_1~320_n in response to the prefetched data to be transferred to the corresponding Masters 320_1~320_n is not corresponded to the address signal provided by the corresponding Masters 320_1~320_n, to indicate to the corresponding Masters 320_1~320_n to ignore the prefetched data.

In response to the control signal M_HTRANS from the corresponding Masters 320_1~320_n indicates that the transmission type is Non-sequential, i.e. the current transferring address and control signals are unrelated to the last transferring address and control signals but is matched to a hit logic, the prefetching controller 211 may also direct the select circuit 213 to provide the prefetching address signal generated by the prefetching address generator 212 to the register group 215 to store the prefetching address signal. Next, the prefetching address signal is transferred to the corresponding first devices 330_1~330_n. Next, the corresponding first devices 330_1~330_n may read the data as a prefetched data according to the prefetching address signal and transfer the prefetched data to the register group 216 to store the prefetched data, and then the prefetched data is transferred to the select circuit 214. Next, the prefetching controller 211 may direct the select circuit 214 to transfer the prefetched data from the register group 216 to the corresponding Masters 320_1~320_n via the corresponding first routers 311_1~311_n and the corresponding arbitrators 312_1~312_n. Similarly, the prefetching controller 211 may issue a signal SR to the corresponding Masters 320_1~320_n via the corresponding first routers 311_1~311_n and the corresponding arbitrators 312_1~312_n in response to the prefetched data to be transferred to the corresponding Masters 320_1~320_n is corresponded to the address signal provided by the corresponding Masters 320_1~320_n, to indicate to the corresponding Masters 320_1~320_n to receive the prefetched data. On the contrary, the prefetching controller 211 may issue a signal SR to the corresponding Masters 320_1~320_n in response to the prefetched data to be transferred to the corresponding Masters 320_1~320_n is not corresponded to the address signal provided by the corresponding Masters 320_1~320_n, to indicate to the corresponding Masters 320_1~320_n to ignore the prefetched data. In the embodiment, the hit logic is matched when the signals S_HADDR, S_HWRITE and S_HSIZE received by the first devices 330_1~330_n are identical to the signals M_HADDR, M_HWRITE and M_HSIZE transferred by the corresponding Masters 320_1~320_n, wherein the signal M_HADDR is an address signal provided by the Master, the signal M_HWRITE is a control signal provided by the Master for indicating a read or write operation, and the signal M_HSIZE is a control signal provided by the Master for indicating the size of the transmission data.

In response to the control signal M_HTRANS from the corresponding Masters 320_1~320_n indicates that the transmission type is Busy, Idle or Non-sequential but is not matched with the hit logic, the prefetching controller 211 may direct the select circuit 213 to provide the address signal from the corresponding Masters 320_1~320_n to the register group 215 to store the address signal. Next, the address signal is transferred to the corresponding first devices 330_1~330_n. Next, the corresponding first devices 330_1~330_n may read the data corresponding to the address signal and transfer the read data to the select circuit 214. Next, the prefetching controller 211 may direct the select circuit 214 to transfer the read data from the corresponding first devices 330_1~330_n to the corresponding Masters 320_1~320_n via the corresponding first routers 311_1~311_n and the corresponding arbitrators 312_1~312_n.

In the embodiment, the prefetching controller 211 may comprise an address storage for storing a specific address, wherein the specific address may be an address range, a single address or various addresses corresponding to the address of one or more first devices 330_1~330_n. In response to the address signal from the Masters 320_1~320_n is corresponded to the specific address, the prefetching controller 211 directs the prefetching address generator 212 to not generate the prefetching address signal.

Figure 4:
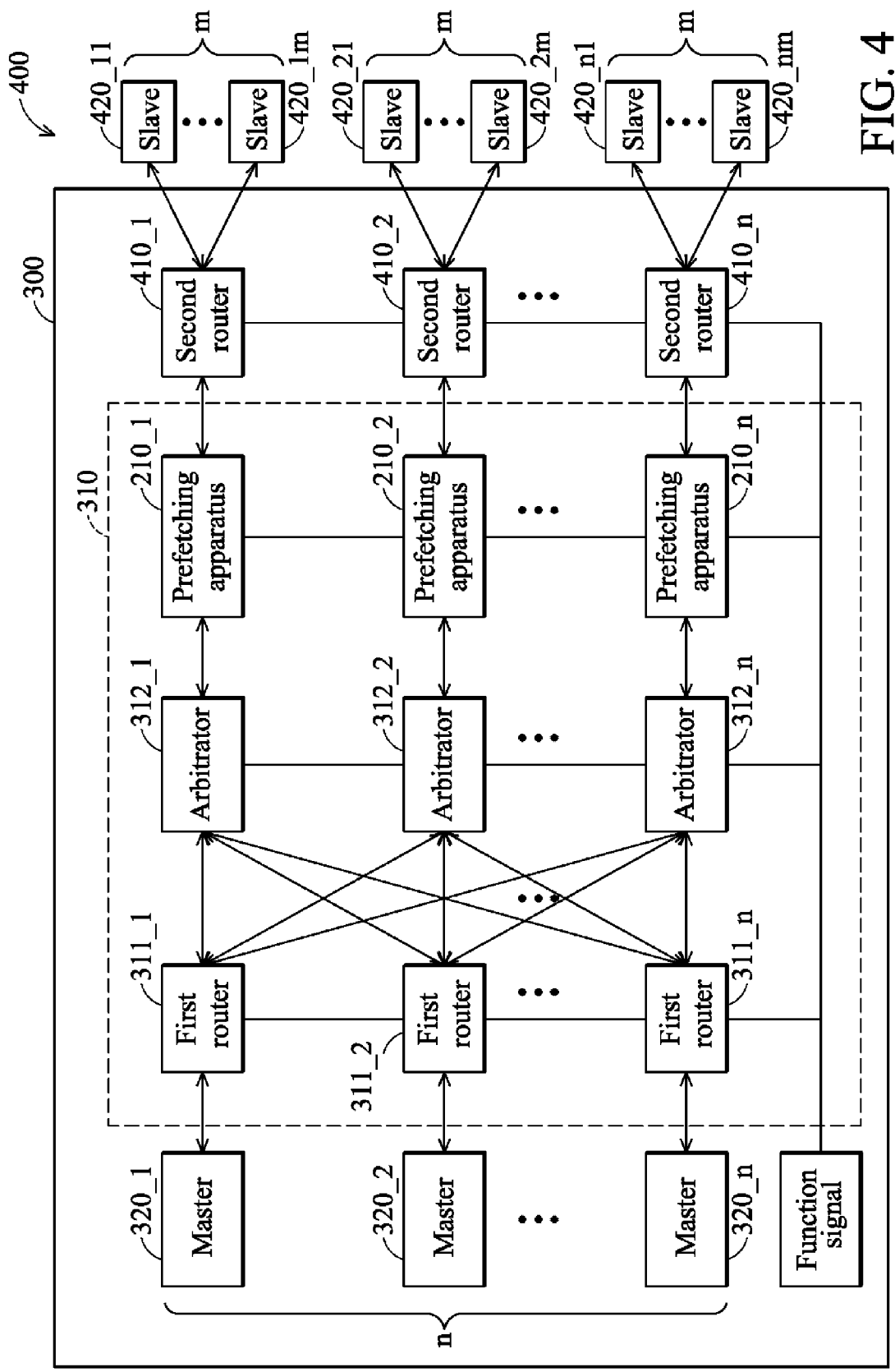
FIG. 4 shows a block diagram of another prefetching system according to an embodiment of the invention.

In one embodiment, the first devices 330_1~330_n may also be the second routers 410_1~410_n, and the prefetching system 300 may become another embodiment for supporting n Masters and n×m Slaves. As shown in FIG. 4, a prefetching system 400 comprises the prefetching system 300 and the Slaves 420_11~420_nm, wherein the second routers 410_1~410_n are the first devices 330_1~330_n of FIG. 3. Each of the second routers 410_1~410_n is coupled to m Slaves, and is used to transfer the signal from the corresponding prefetching apparatuses 210_1~210_n to the corresponding Slaves 420_11~420_nm or from the Slaves 420_11~420_nm to the corresponding prefetching apparatuses 210_1~210_n. The prefetching system 400 may be an advanced high-performance bus system. In the prefetching system 400, first, the Masters 320_1~320_n may transfer a signal to the first routers 311_1~311_n, wherein the signal comprises the control signals and address signals. In the embodiment, a control signal M_HWRITE indicates to read data. Next, the first routers 311_1~311_n may transfer the signals from the Master 320_1~320_n to the corresponding arbitrators 312_1~312_n according to the address signal M_HADDR, and then the arbitrators 312_1~312_n may transfer the signals to the corresponding prefetching apparatuses 210_1~210_n, to generate the prefetching address signal and transfer the prefetching address signal to the corresponding Slaves 420_11~420_nm via the second routers 410_1~410_n. For example, the Master 320_1 may transfer a signal to the first router 311_1, wherein an address signal of the transferred signal is corresponding to the Slave 420_n1. Next, the first router 311_1 may transfer the signal to the arbitrator 312_n. Next, the arbitrator 312_n may transfer the signal to the corresponding prefetching apparatus 210_n, to generate the prefetching address signal and transfer the prefetching address signal to the Slave 420_n1 via the second router 410_n. The prefetching data scheme of the prefetching apparatuses 210_1~210_n in the prefetching system 400 has the same design with the prefetching apparatuses 210_1~210_n of the prefetching system 300.

Figure 5:
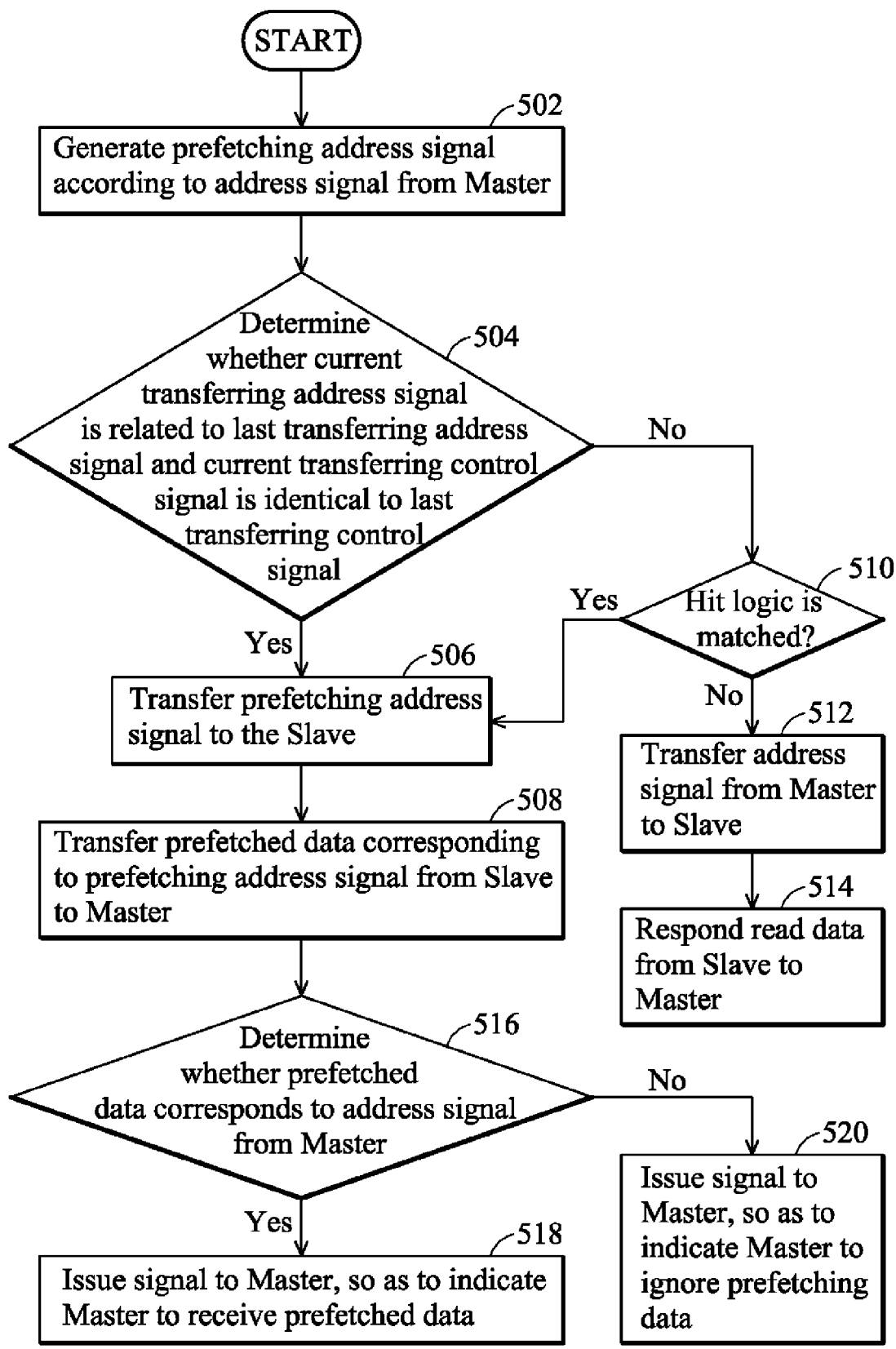
FIG. 5 shows a method for prefetching data in a bus system according to an embodiment of the invention.

FIG. 5 shows a method for prefetching data in a bus system according to an embodiment of the invention. Referring to FIG. 5 and FIG. 2 together, first, the prefetching address generator 212 may predict a next possible read address to generate a prefetching address signal according to an address signal M_HADDR and a control signal M_HBURST from the Master 220 (step 502), and transfer the prefetching address signal to the select circuit 213. Next, the prefetching controller 211 may determine whether the current transferring address signal is related to the last transferring address signal and the current transferring control signal is identical to the last transferring control signal (step 504). In response to a control signal M_HTRANS from the Master 220 indicates that a transmission type is Sequential, i.e. a current transferring address signal is related to a last transferring address signal and a current transferring control signal is identical to a last transferring control signal, the prefetching controller 211 may direct the select circuit 213 to provide the prefetching address signal generated by the prefetching address generator 212 to the Slave 230 (step 506). Next, the Slave 230 may read the data as a prefetched data according to the prefetching address signal and transfer the prefetched data to the select circuit 214, and then the prefetching controller 211 may direct the select circuit 214 to transfer the prefetched data provided by the Slave 230 to the Master 220 (step S508). At this time, the prefetching controller 211 may determine whether the prefetched data is corresponded to the address signal from the Master 220 (step S516). In response to the prefetched data to be transferred to the Master 220 is corresponded to the address signal provided by the Master 220, the prefetching controller 211 may issue a signal SR to the Master 220, to indicate to the Master 220 to receive the prefetched data (step 518). On the contrary, the prefetching controller 211 may issue a signal SR to the Master 220 in response to the prefetched data to be transferred to the Master 220 is not corresponded to the address signal provided by the Master 220, to indicate to the Master 220 to ignore the prefetched data (step 520).

In response to the control signal M_HTRANS from the Master 220 indicates that the transmission type is Non-sequential, i.e. the current transferring address and control signals are unrelated to the last transferring address and control signals, the prefetching controller 211 may determine whether the signal transmission of the system is matched to a hit logic (step 510). The hit logic is matched when the signals S_HADDR, S_HWRITE and S_HSIZE received by the Slave 230 are identical to the signals M_HADDR, M_HWRITE and M_HSIZE transferred by the Master 220, wherein the signal M_HADDR is an address signal provided by the Master, the signal M_HWRITE is a control signal provided by the Master for indicating a read or write operation, and the signal M_HSIZE is a control signal provided by the Master for indicating the size of the transmission data. When it is determined that the hit logic is matched, the prefetching controller 211 may direct the select circuit 213 to provide the prefetching address signal generated by the prefetching address generator 212 to the Slave (step 506). Next, the Slave 230 may read the data as a prefetched data according to the prefetching address signal and transfer the prefetched data to the select circuit 214, and then the prefetching controller 211 may direct the select circuit 214 to transfer the prefetched data provided by the Slave 230 to the Master 220 (step S508). At this time, the prefetching controller 211 may determine whether the prefetched data is corresponded to the address signal from the Master 220 (step S516). In response to the prefetched data to be transferred to the Master 220 is corresponded to the address signal provided by the Master 220, the prefetching controller 211 may issue a signal SR to the Master 220, to indicate to the Master 220 to receive the prefetched data (step 518). On the contrary, the prefetching controller 211 may issue a signal SR to the Master 220 in response to the prefetched data to be transferred to the Master 220 is not corresponded to the address signal provided by the Master 220, to indicate to the Master 220 to ignore the prefetched data (step 520). Furthermore, when the hit logic is not matched, the prefetching controller 211 may direct the select circuit 213 to transfer the address signal provided by the Master 220 to the Slave 230 (step 512). Next, the Slave 230 may read the data corresponding to the address signal and transfer the read data to the select circuit 214. Next, the prefetching controller 211 may direct the select circuit 214 to transfer the read data from the Slave 230 to the Master 220 (step 514).

Figure 6:
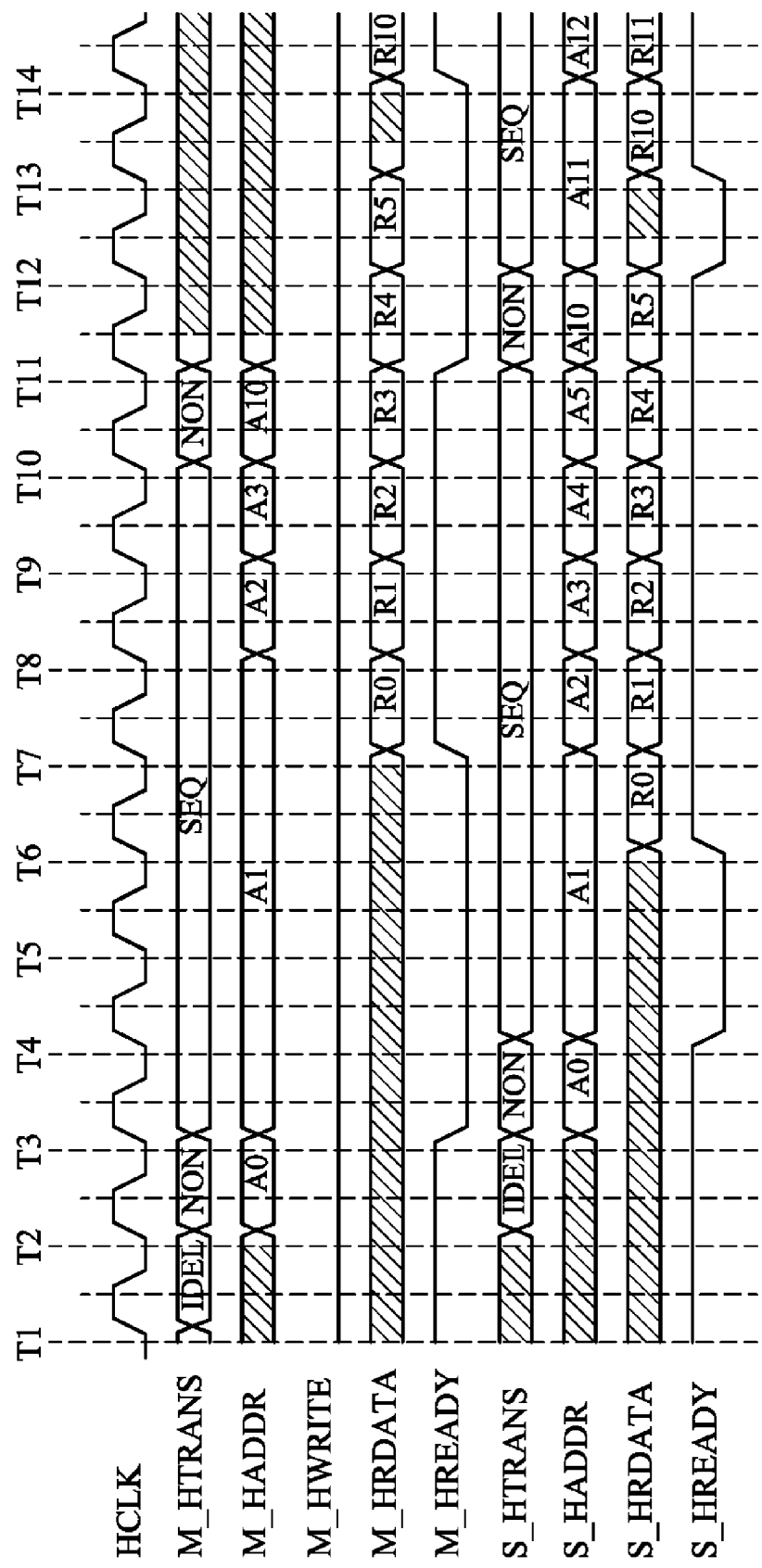
FIG. 6 shows a timing diagram of the signals within a prefetching apparatus according to an embodiment of the invention.

FIG. 6 shows a timing diagram of the signals within a prefetching apparatus according to an embodiment of the invention. As shown in FIG. 6, the signal M_HTRANS is a control signal provide by the Master to indicate the transmission type, which comprises Idle, Busy, Sequential and Non-sequential. The signal M_HADDR is an address signal provide by the Master, and the signal M_HRDATA is the data received by the Master. The signal M_HWRITE is a control signal provided by the Master to indicate read or write operation, and the signal M_HREADY is a signal received by the Master to indicate to the Master to receive or ignore the transmission data. The signal S_HADDR is an address signal received by the Slave, and the signal S_HRDATA is the read data responded by the Slave. In the embodiment, the control signal M_HWRITE is low which indicates to read data. In time period T2, the Master 220 may issue the signal M_HTRANS to indicate that the transmission type is Non-sequential and the signal M_HADDR to indicate that the address is A0. At the time, the prefetching address signal is not generated by the prefetching apparatuses 210. In time period T3, the Slave 230 may receive the address signal A0, and the Master 220 may transfer the signal M_HTRANS to indicate that the transmission type is Sequential and the signal M_HADDR to indicate that the address is A1. At the time, the prefetching apparatuses 210 may generate the prefetching address signal. In time period T4, the Slave 230 may receive the address signal A1. In time period T7, the Slave 230 may start to receive a serial of the prefetching address signals A2, A3, A4 and A5. In time period T6, the Slave 230 may start to respond to a serial of the read data R0, R1, R2, R3, R4 and R5. Due to the Slave 230 receiving the prefetching address signal to prefetch the data, the Master 220 may receive the data R2 and R3 at the next time period after the address signals A2 and A3 are transferred. In addition, in time periods T7~T10, the data R0, R1, R2 and R3 responding to the Master 220 correspond to the address signals provide by the Master 220, thus the signal M_HREADY received by the Master 220 is high which indicates to the Master 220 to receive the data. In time periods T11~T12, the prefetched data R4 and R5 response to the Master 220 is not corresponded to the address signals provide by the Master 220, thus the signal M_HREADY received by the Master 220 is low which indicates to the Master 220 to ignore the data.

In a conventional advanced high-performance bus system, more than three time periods are needed to receive corresponding read data after a Master transfers an address signal. In the advanced high-performance bus system of the invention, after the address signal is transferred, the Master may receive corresponding data at a next time period by prefetching the data with the prefetching apparatus during signal transmission, thereby increasing reading speed and bus efficiency.

While the invention has been described by way of example and in terms of preferred embodiment, it is to be understood that the invention is not limited thereto. Those who are skilled in this technology can understand that any bus system with the address, data and signal lines may be applied to the apparatus and method disclosed in the invention. Those who are skilled in this technology can also still make various alterations and modifications without departing from the scope and spirit of this invention. Therefore, the scope of the present invention shall be defined and protected by the following claims and their equivalents.

What is claimed is:

1. An apparatus for prefetching data in a bus system, coupled to a Master and a Slave, comprising:

a first select circuit, receiving a plurality of input signals from the Master and a prefetching address generator, and selecting one signal from the plurality of input signals to output to the Slave, wherein the plurality of input signals comprise an address signal from the Master;

the prefetching address generator, generating a prefetching address signal according to the address signal from the Master and transferring the prefetching address signal to the first select circuit; and a prefetching controller controlling the first select circuit, wherein the prefetching controller directs the first select circuit to transfer the prefetching address signal generated from the prefetching address generator to the Slave in response to a prefetching condition is present, wherein the prefetching condition is present if a signal from the Master indicates that the address signal is related to a last address signal and a control signal is identical to a last control signal, or if the signal indicates that the address signal and the control signal are unrelated to the last address and control signals but is matched to a hit logic.

2. The apparatus as claimed in claim 1, wherein the prefetching controller further comprises an address storage for storing a specific address, wherein in response to the address signal from the Master is corresponded to the specific address, the prefetching controller directs the prefetching address generator to stop generating the prefetching address signal and directs the first select circuit to transfer the address signal from the Master to the Slave.

3. The apparatus as claimed in claim 1, further comprising:
a first register group coupled to the first select circuit and the Slave, storing instructions and data;
a second select circuit, receiving a plurality of input signals from the Slave, and selecting one signal from the plurality of input signals to output to the Master according to the prefetching controller; and
a second register group coupled to the second select circuit and the Slave, storing data,
wherein the prefetching controller directs the second select circuit to transfer a prefetched data corresponding to the prefetching address signal from the Slave to the Master in response to the prefetching condition is present.

4. The apparatus as claimed in claim 3, wherein the prefetching controller directs the Master to ignore the prefetched data if the prefetched data transferred to the Master is not corresponded to the address signal from the Master.

5. The apparatus as claimed in claim 3, wherein the prefetching controller directs the Master to receive the prefetched data if the prefetched data transferred to the Master is corresponding to the address signal from the Master.

6. The apparatus as claimed in claim 1, wherein the hit logic is matched when the signals HADDR, HWRITE and HSIZE received by the Slave are identical to the signals HADDR, HWRITE and HSIZE transferred by the Master if the bus system is an advanced high-performance bus (AHB) system.

7. A system for prefetching data in a bus system, coupled to n Masters and n first devices, wherein all Masters are full connected to all first devices via the system, the system comprising:
n arbitrators, arbitrating the transferring sequences of received signals;
n first routers, each coupled to a corresponding Master and all of the n arbitrators, wherein the first routers transfer the signals from the Masters to the corresponding arbitrators or from the arbitrators to the corresponding Masters according to an address signal of the received signals; and
n prefetching apparatuses, each coupled to a corresponding arbitrator and a corresponding first device, each prefetching apparatus comprising:
a first select circuit, receiving a plurality of input signals from the corresponding arbitrator and a prefetching address generator, and selecting one signal from the plurality of input signals to output to the corresponding first device, wherein the plurality of input signals comprise the address signal from the corresponding Master;
the prefetching address generator, generating a prefetching address signal according to the address signal from the corresponding Master via the corresponding first router and the corresponding arbitrator and transferring the prefetching address signal to the first select circuit; and
a prefetching controller controlling the first select circuit, wherein the prefetching controller directs the first select circuit to transfer the prefetching address signal generated from the prefetching address generator to the corresponding first device in response to a prefetching condition is present.

8. The system as claimed in claim 7, wherein the n first devices comprises n Slaves.

9. The system as claimed in claim 7, wherein each of the first devices is coupled to m Slaves, and wherein each of the first devices transfers the signals from the corresponding prefetching apparatuses to a corresponding Slave or from the m Slaves to the corresponding prefetching apparatus.

10. The system as claimed in claim 7, wherein the prefetching controller further comprises an address storage for storing a specific address, wherein in response to the address signal from the corresponding Master via the corresponding first router and the corresponding arbitrator is corresponded to the specific address, the prefetching controller directs the prefetching address generator to stop generating the prefetching address signal and directs the first select circuit to transfer the address signal from the corresponding Master to the corresponding first device.

11. The system as claimed in claim 7, wherein the prefetching apparatus further comprises:
a first register group coupled to the first select circuit and the corresponding first device, storing instructions and data;
a second select circuit, receiving a plurality of input signals from the corresponding first devices, and selecting one signal from the plurality of input signals to output to the corresponding arbitrator according to the prefetching controller; and
a second register group coupled to the second select circuit and the corresponding first device, storing data,
wherein the prefetching controller directs the second select circuit to transfer a prefetched data corresponding to the prefetching address signal from the corresponding first devices to the corresponding Master via the corresponding first router and the corresponding arbitrator in response to the prefetching condition is present.

12. The system as claimed in claim 11, wherein the prefetching controller directs the corresponding Master to ignore the prefetched data if the prefetched data transferred to the corresponding Master is not corresponded to the address signal from the Master.

13. The system as claimed in claim 11, wherein the prefetching controller directs the corresponding Master to receive the prefetched data if the prefetched data transferred to the corresponding Master is corresponding to the address signal from the Master.

14. The system as claimed in claim 7, wherein the prefetching condition is present if a signal from the corresponding Master via the corresponding first router and the corresponding arbitrator indicates that the address signal is related to a last address signal and a control signal is identical to a last control signal, or if the signal indicates that the address signal and the control signal are unrelated to the last address and control signals but is matched to a hit logic, wherein the hit logic is matched when the signals HADDR, HWRITE and HSIZE received by the corresponding first device are identical to the signals HADDR, HWRITE and HSIZE transferred by the corresponding Master if the bus system is an advanced high-performance bus system.

15. A method for prefetching data in a bus system, comprising:
  generating a prefetching address signal by a prefetching address generator according to an address signal from a Master;
  controlling a first select circuit by a prefetching controller to transfer the prefetching address signal to a Slave in response to a prefetching condition is present,
  wherein the prefetching condition is present if a signal from the Master indicates that the address signal is related to a last address signal and a control signal is identical to a last control signal, or if the signal indicates that the address signal and the control signal are unrelated to the last address and control signals but is matched to a hit logic.

16. The method as claimed in claim 15, wherein the prefetching controller further comprises an address storage for storing a specific address, wherein in response to the address signal from the Master is corresponded to the specific address, the prefetching controller directs the prefetching address generator to stop generating the prefetching address signal and directs the first select circuit to transfer the address signal from the Master to the Slave.

17. The method as claimed in claim 15, further comprising:
  storing the signal outputted by the first select circuit into a first register group, wherein the first register group is coupled to the first select circuit and the Slave;
  controlling a second select circuit by the prefetching controller to transfer a prefetched data corresponding to the prefetching address signal from the Slave to the Master in response to the prefetching condition is present; and
  storing the prefetched data corresponding to the prefetching address signal from the Slave into a second register group, wherein the second register group is coupled to the second select circuit and the Slave.

18. The method as claimed in claim 17, wherein the prefetching controller directs the Master to ignore the prefetched data if the prefetched data transferred to the Master is not corresponded to the address signal from the Master.

19. The method as claimed in claim 17, wherein the prefetching controller directs the Master to receive the prefetched data if the prefetched data transferred to the Master is corresponding to the address signal of the Master.

20. The method as claimed in claim 15, wherein the hit logic is matched when the signals HADDR, HWRITE and HSIZE received by the Slave are identical to the signals HADDR, HWRITE and HSIZE transferred by the Master if the bus system is an advanced high-performance bus system.

* * * * *